Oct. 10, 1950 W. J. SCHUPNER 2,525,317
SHOCK ABSORBER
Filed April 17, 1948 2 Sheets-Sheet 1
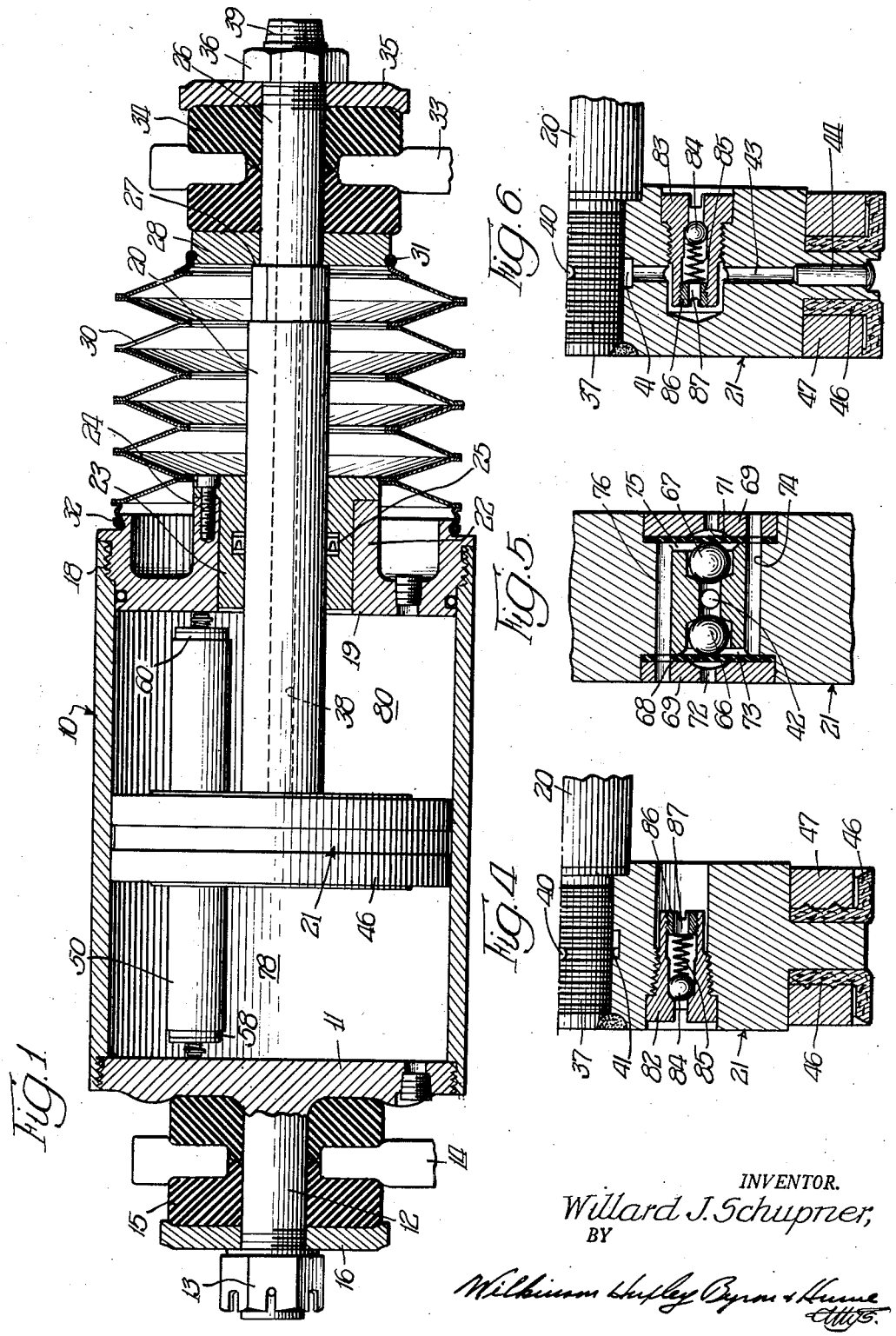
INVENTOR.
Willard J. Schupner,
BY

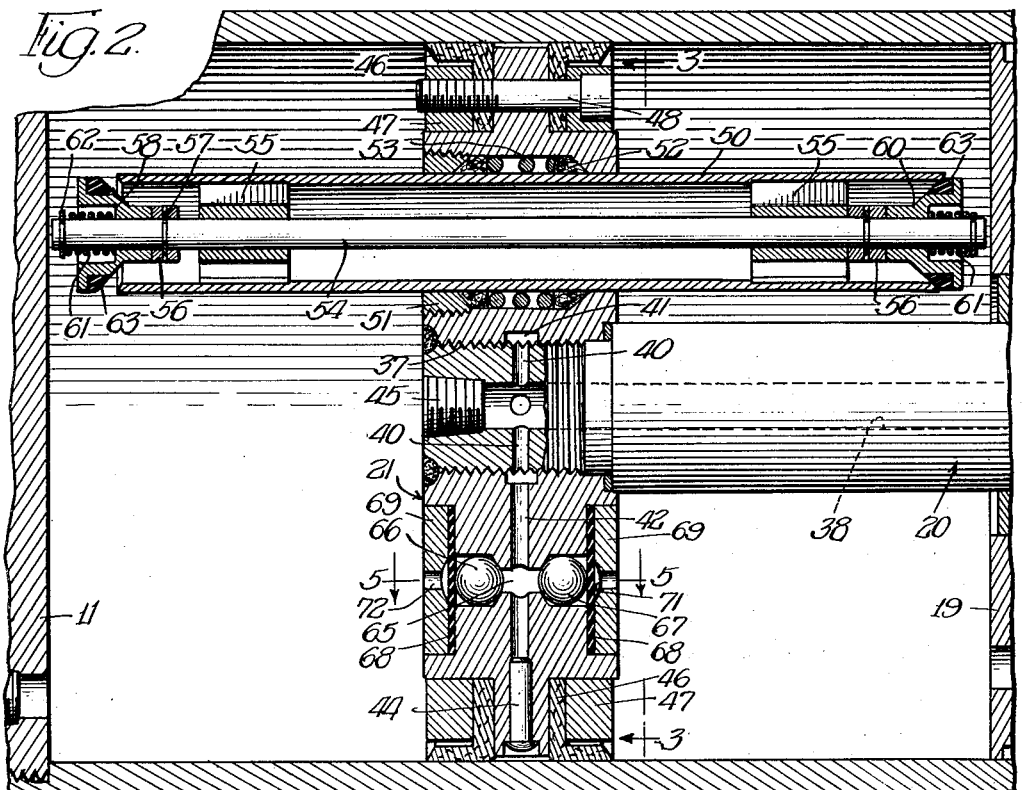

Patented Oct. 10, 1950

2,525,317

UNITED STATES PATENT OFFICE 2,525,317

SHOCK ABSORBER

Willard J. Schupner, Evanston, Ill., assignor to Hanna Engineering Works, Chicago, Ill., a corporation of Illinois Application April 17, 1948, Serial No. 21,720

6 Claims. (Cl. 188—88)

The invention relates to shock absorbing cylinders and has reference in particular to pneumatic shock absorbing and snubbing devices for use on vehicles and the like for resisting initial approaching or separating movement of parts of the vehicle and for checking rebound and succeeding back and forth movements of the same.

An object of the invention resides in the provision of a double-acting checking or cushioning device of the pneumatic type essentially consisting of a cylinder with reciprocating piston and wherein the piston carries a valve member operated automatically by movement of the piston to permit flow of air through the piston in a controlled manner.

A further object of the invention is to provide a shock absorbing and cushioning cylinder having an improved valve member carried by the piston so as to be movable relative thereto and which will be operated automatically as a result of back and forth movement of the piston, the valve member functioning at predetermined times in the stroke of the piston to permit flow of air through the piston from one end of the cylinder to the opposite end to thereby intensify the snubbing effect.

The valve member of the invention operates in a dual manner on each cycle. Initially the valve member operates to communicate or connect the spaces on opposite sides of the piston after a small amount of movement of the piston has taken place in either direction. This action equalizes the pressure on the respective sides of the piston by relieving the high pressure in one end of the cylinder and by increasing the low pressure in the opposite end. This reduces the driving effect on the piston and increases in a corresponding manner the resisting effect. Secondly, the valve member is automatically operated by continued movement of the piston in either direction to close the valve passage in the piston whereby a pressure is caused to build up in front of the piston for checking movement in that direction.

Therefore another object of the invention is to provide a pneumatic shock absorbing and snubbing cylinder of the pressure type for use on movable parts of vehicles and the like which will incorporate a novel valve member having operation as above described for cushioning the movement between said parts.

A further object of the invention resides in the provision of a shock absorbing and snubbing cylinder having an arrangement of valves and associated parts incorporated in the piston for admitting a fluid medium from an external source to the cylinder spaces on the respective sides of the piston when the pressure in each space is less than the supply pressure, and wherein the flow of said medium into each cylinder space is terminated when the pressure in any one is raised to the pressure of the external source.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a longitudinal sectional view taken substantially through the center of a shock absorbing and snubbing cylinder constructed in accordance with the present invention;

Figure 2 is an enlarged detail sectional view of the piston showing the improved valve member of the invention and other structural features;

Figure 3 is a transverse sectional view taken substantially along line 3—3 of Figure 2;

Figure 4 is a fragmentary sectional view showing one of the safety relief valves carried by the piston;

Figure 5 is a fragmentary sectional view showing in detail the diaphragm valve means for controlling the air supply to the cylinder spaces on the respective sides of the piston; and Figure 6 is a fragmentary sectional view of the piston showing in detail another safety relief valve.

Referring to the drawings, and particularly Figure 1, the embodiment selected for illustrating the present invention is shown as comprising a cylinder 10 having suitably secured to the rear end thereof the end member 11. The end member is provided with a central rearwardly projecting stud 12 having a threaded extremity for receiving the securing nut 13. The stud functions as securing means for the bracket 14 which is provided with an aperture somewhat larger than the stud so that substantial movement can occur between the same and the bracket. The bracket is preferably dished for receiving the rubber cushioning members 15 which are also supported by the stud and the whole assembly is retained in place, being securely united to the end member 11 by the cap 16. It will be seen that a rubberized substantially uniform joint is provided between the bracket 14 and the cylinder 10, it being understood that the bracket may be secured to a part of the vehicle having movement relative to another part or with respect to which movement takes place.

The forward end of the cylinder 10 is internally threaded at 18 for receiving the forward end member 19 which is accordingly releasably secured to the cylinder at this end. The member 19 is provided with an opening for passage of the piston rod 20 centrally through the end member. The piston rod 20 has the piston 21 suitably secured thereto and which is adapted to reciprocate within cylinder 10 from a position adjacent the rear end member 11 to the forward end member 19 and return. The central opening in end member 19 is defined by the forwardly extending boss 22 which is adapted to receive the packing gland 23 releasably secured in place by screws 24 and which gland provides the sealing ring 25. The piston rod 20 has a close fit in the packing gland 23 which in addition to the sealing ring 25 assures an hermetical seal at this end of the cylinder although permitting free and unobstructed reciprocating movement of the piston rod as is well understood in shock absorbers of this type.

The projecting end of the piston rod is slightly reduced in diameter at 26 to form the shoulder 27 against which is positioned the disc 28. The disc provides an anchorage for one end of the bellows 30, the same being suitably fixed to said disc around the periphery thereof as at 31. The other end of the bellows member 30 is suitably secured to the forward end member 19, the securing instrumentalities for this end of the bellows being indicated by numeral 32.

Reduced portion 26 of the piston rod provides securing means for the bracket 33 which has an aperture of large diameter for receiving the reduced end and whereby substantial movement may take place between the bracket and the piston rod 20. This movement, however, is cushioned by the rubber cushioning members 34 located on the respective sides of the bracket and securely held in place by means of the end cap 35 and the securing screw 36. The present shock absorbing cylinder is accordingly mounted by means of brackets 14 and 33 to movable parts of a vehicle, airplane, or similar apparatus, wherein it is desired to retard and cushion to and fro movement between the parts. The piston 21 of the present cylinder incorporates an improved valve member and associated parts which operate automatically as a result of movement of the piston to provide for flow of air through the piston at predetermined times and for preventing said flow at other predetermined times. The structure of the piston and mode of operation of the valve means to accomplish the above objectives will now be described.

The piston is shown in section in Figure 2 where it will be seen that piston rod 20 is threadedly secured to said piston at 37. The piston rod is provided with a central bore 38 extending for the entire length of the rod but closed at one end by the plug 45. At the threaded end 39 said piston rod may connect with a flexible hose or the like for supplying air under pressure to said longitudinally extending bore. At threaded end 37 of the piston rod a plurality of radially extending passages 40 are provided which connect the central bore 38 with the circumferential groove 41 formed in the piston. Radially extending passages 42 and 43 are also provided in the piston, see Figures 5 and 6, and each passage is closed at the periphery of the piston by a plug or similar member 44. However, the opposite end of passages 42 and 43 connect with groove 41 and thus with passages 40 and with the central bore 38 whereby said first mentioned passages are supplied with air under pressure from said source.

Said piston adjacent the periphery thereof is cut away on each side for receiving the leather packing rings 46 and which are retained in place on the piston by the retaining rings 47 and securing screws 48. The valve member which is carried by the piston in a manner permitting relative movement between the parts consists of a valve sleeve 50 supported by the piston and extending in a direction parallel to the piston rod 20. The sleeve 50 extends through an opening in the piston, which opening is closed at one end by the threaded collar 51. Leakage of air around the sleeve 50 from one side of the piston to the other is prevented by packing 52 yieldingly maintained in place by said collar and by the coil spring 53. With the piston 21 in midposition as shown in Figure 2 it will be seen that the sleeve 50 is centrally located with its ends equally spaced from the end members 11 and 19. The valve rod 54 extends centrally through the sleeve 50, being supported at its respective ends by the spiders 55. The valve rod 54 has a length almost equal to the distance from end member 11 to end member 19. At each end of the valve rod, outwardly of the spider 55, the rod is provided with a stop collar 56 held to the rod by the retaining clip 57. The valve members 58 and 60 are identical in construction, being mounted on respective ends of valve rod 54 and maintained in contact with stop collar 56 by the tension of spring 61. Each tension spring encircles the valve rod and is confined between the valve member and the retaining ring 62 suitably fixed to the extreme outer ends respectively of the valve rod. Each member is adapted to have valve action with its end of the sleeve 50 for which purpose each end of the sleeve is bevelled and it will be observed that each valve member is provided with a packing 63 of soft leather adapted to engage with its bevelled end of the sleeve to close the valve opening at said end.

In operation of the structure above described it will be seen that movement of the piston in either direction will carry with it the sleeve 50 until the valve rod 54 is caused to contact end member 11 or 19, depending on the direction of movement of the piston. Assuming for purposes of explanation, that the piston is moving in a direction toward the left, Figure 2, it will be seen that contact of valve rod 54 with end member 11 will open valve member 60 with respect to sleeve 50, with the result that flow of air can take place through the sleeve to equalize the pressures on the respective sides of the piston. If the pressure in the right hand end 80 of the cylinder was higher at the start of said movement of the piston than the pressure in the left hand end 78 of the cylinder, then the action of the sleeve 50 in opening valve member 60 allows flow of air to take place through the piston, equalizing the pressures in the respective ends and thus reducing the driving effect on the piston.

As movement of the piston 21 continues in a direction toward the left the sleeve will presently be caused to contact valve member 58 with the result that the passage through the piston is closed. However, should this movement be so rapid that the passage is closed before the volume of air required to equalize the pressure has passed through it, the higher pressure communicating with the interior of sleeve 50 will force valve member 58 against resilient spring 61 with the result that the passage through the piston is again open, permitting the remaining volume of high pressure air to enter cylinder space 78, after which spring 61 returns member 58 against sleeve 50, closing the passage.

The movement of sleeve 50 is limited in its travel in either direction with respect to valve rod 54 since it will be seen that spider 55 will contact stop collar 56, preventing further movement. Sleeve 50 contacts members 58 and 60 before spider 55 reaches the respective collars 56, thus assuring positive check action of the valves. Continued movement of the piston therefore builds up a high pressure in this left end 78 of the cylinder, providing a snubbing or resisting effect tending to check movement of the piston in this left hand direction.

As the piston reverses its stroke and starts to move in a right hand direction sleeve 50 will be carried by the piston until the valve rod 54 contacts end member 19 which checks further movement of the valve rod and additional movement of the sleeve with the piston will open valve member 58 with respect to the sleeve. The high pressure air in the left hand end of the cylinder is allowed to flow through the piston to substantially equalize the pressure on the respective sides of the piston. Continued movement of the piston in a right hand direction will cause sleeve 50 to close against valve member 60, and then further movement will eventually compress the air trapped in the right hand end 80 of the cylinder and a high pressure is built up to check movement of the piston in this direction.

The shock absorbing and snubbing effect produced by the present device can be materially increased by increasing the air pressure in the cylinder. In many cases the forces that must be checked by the shock absorber are material, and since it is desirable and often necessary to keep the device small and compact, air at a relatively high pressure is used. In the present device the air is admitted to the respective ends of the cylinder by the bore 38 which communicates with the radial passages 42 and 43. As best shown in Figures 2 and 5, passage 42 communicates with the transverse passage 65 having enlargements on the respective sides of the piston for receiving valve members in the form of hardened steel balls 66 and 67. A diaphragm 68 of synthetic rubber or other suitable material is located in substantially central relation over each ball. The hardened steel balls and the diaphragms are retained by discs 69 which are secured to the piston by securing screws 70. To provide for movement of the hardened steel balls 66 in a releasing direction discs 69 are recessed as at 71 and each disc is formed with a central opening 72 so that each diaphragm is subject to the air pressure within its end of the cylinder.

Assuming the piston to be in mid-position volumetrically of the cylinder with atmospheric pressure on both sides, then upon admitting air from the external source the same is conducted by the bore 38 to passage 42 and to the transverse passage 65 with the result that the hardened steel balls are forced outwardly against their respective diaphragms to open the passage at each end. As best shown in Figure 5, the air under pressure from passage 65 escaping past ball 66 will be conducted by groove 73 to passage 74 which extends in a direction toward the right so as to communicate with the right hand end 80 of the cylinder. However, ball 66, which therefore controls supply of said air under pressure to the right end of the cylinder, is subjected to air pressure prevailing in the space 78 in the left end of the cylinder. In a similar manner the air from transverse passage 65 escaping past the hardened steel ball 67 will be conducted by groove 75 to the passage 76 which extends in a direction toward the left to communicate with the left end 78 of the cylinder. This air which feeds into the left end of the cylinder is thus controlled by ball 67 which is subjected to the pressure prevailing in the right side of the piston.

As a result of the structure above described the supply of air to both cylinder spaces is shut off when supply pressure or a predetermined part of said supply pressure is reached in one of the cylinder spaces. This will best be understood by assuming that air pressures, diaphragm resistance, ball diameters and flow capacity are approximately equally matched. Starting with equal cylinder volumes it will be seen that rates of flow into the cylinder spaces 78 and 80 will be equal and pressures in the two cylinder spaces will increase uniformly until both pressures have been raised to supply pressure or to a predetermined part of said supply pressure. However, if for some reason pressure in one cylinder space should be raised to the limiting pressure sooner than that in the other cylinder space, then the same will act to shut off further flow into both cylinder spaces. For example, should the pressure in the rear cylinder space 78 be increased to supply pressure or to a predetermined part of said supply pressure before that in the forward cylinder space 80, said latter pressure will act upon ball 67 to prevent further flow through passage 76 into the rear cylinder space. The purpose of the arrangement here disclosed is to provide that when the cylinder is operative all air that is forced into or out of the cylinder spaces during the shock absorbing and snubbing action shall move through the piston under control of the valve member to perform the dual function of reducing the driving pressure and increasing the resisting pressure on the piston.

In order to avoid excessively high pressures in the cylinder spaces on the respective sides of the piston the invention provides relief valves 82 and 83, Figures 4 and 6, respectively. Each valve member is threaded in the piston and said valve includes a ball member 84 backed by a coil spring 85 which maintains the ball in contact with its seat. Each coil spring is maintained in place by a slotted adjusting screw 86. The screws are provided with a central bore 87 forming an outlet passage for the respective relief valves. By adjustment of the screws 86 proper pressure can be applied to the ball valves 84 so that they will maintain a closed position during operation of the piston under normal conditions. However, should an excessive pressure for some reason or other exist in either the forward or rear cylinder space the respective relief valve will open against the tension of its backing spring to permit release of the pressure. Relief valve 82 will operate in this manner to relieve excessive pressure in cylinder space 78, the air passing through the valve into cylinder space 80. However, with respect to valve 83, said valve operates to relieve excessive pressure in the cylinder space 80 by conducting air from said space and delivering the same to the radial passage 83 connecting with the source of air under pressure.

The valve structure of the invention is carried by the piston with sleeve 50 capable of sliding movement relative to the piston. Said sleeve provides a passage through the piston through which flow of a fluid medium such as air can take place from either end of the cylinder to each other. A valve member is associated with each end of the sleeve and thus the valve members have a position on respective sides of the piston. The action of this valve structure is such that the valve members have closing and opening action with respect to the passage as a result of reciprocating movement of the piston. More particularly it will be observed that one member will open as the piston moves in one direction from a dead center position and that the other valve member will close following an interval of time, depending on the speed of movement of the piston. In other words, each stroke of the piston from dead center position will first of all open a valve member and the differential pressure between the two sides of the piston in conjunction with the resilient spring 61 effects flow of air through the piston. The action of the piston is to presently cause closing of the other valve member and the interval of time elapsing between these two valve operations, during which flow of air takes place through the piston, is variable, depending on the operating speed of the piston. However, the result of the action of the automatic valve structure as herein described is to intensify the snubbing effect on the piston.

The slidable mounting of the sleeve 50 in the piston provides for relative movement between the parts, which takes place after the valve rod 54 has contacted an end wall of the cylinder and the valve member adjacent said end has closed. The action of the piston on the sleeve for the remainder of the stroke of the piston is to hold the sleeve end in contact with its valve member maintaining the passage closed at this end of the sleeve. For this closing action the valve members rely upon the friction between the piston 21 and the sleeve 50 as well as the air pressure against 58 and 60. Each valve member is provided with a packing 63 to act as a seal at this point.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A shock absorber of the character described including a cylinder closed at its respective ends by end members, a piston movable therein, a piston rod connected to the piston and extending through one end member for imparting reciprocating movement to the piston, valve structure carried by the piston including a sleeve passing through the piston, extending from each side thereof, and capable of slidable movement relative thereto, a valve rod extending through the sleeve and being slidably supported thereby, said valve rod projecting from each end of the sleeve and adapted to contact the end members of the cylinder, a valve member supported by the valve rod at each end of the sleeve for closing and opening action with its end of the sleeve, said valve rod and valve members being constructed and arranged with respect to the sleeve whereby movement of the piston in either direction will open one valve member and thereafter close the other valve member.

2. A shock absorber of the character described including a cylinder closed at its respective ends by end members, a piston movable therein, a piston rod connected to the piston and extending through one end member for imparting reciprocating movement to the piston, valve structure carried by the piston including a sleeve passing through the piston, extending from each side thereof, and capable of slidable movement relative thereto, a valve rod extending through the sleeve and being slidably supported thereby, said valve rod projecting from each end of the sleeve and adapted to contact the end members of the cylinder, a valve member on the valve rod at each end of the sleeve, said valve members being positioned on said rod with respect to the sleeve whereby one valve member is closed against its end of the sleeve the other valve member is open being spaced from its end of the sleeve, and resilient means for each valve member retaining said valve member on the valve rod against a stop fixed to the rod.

3. A shock absorber of the character described including a cylinder closed at its respective ends by end members, a piston movable therein, a piston rod connected to the piston and extending through one end member for imparting reciprocating movement to the piston, valve structure carried by the piston including a sleeve passing through the piston to project from each side thereof and being mounted for slidable movement relative to the piston, a valve rod located within the sleeve parallel to the longitudinal axis of the sleeve and extending substantially from one end member to the other end member, a valve member on the valve rod at each end thereof for closing and opening action with its end of the sleeve, said sleeve having a length with respect to the distance between valve members whereby when one valve member is closed against its end of the sleeve the other member is opened being spaced from its end of the sleeve, and said sleeve being reciprocated by said piston whereby as a result of movement of the piston in either direction one valve member will be opened and the other valve member will be closed following an interval of time depending on the speed of movement of the piston.

4. A shock absorber of the character described, including a cylinder closed at its respective ends by end members, a piston movable therein, a piston rod connected to the piston and extending through one end member for imparting reciprocating movement to the piston, valve structure carried by the piston and having operation at predetermined times in the stroke of the piston to permit flow of air through the piston from one end of the cylinder to the opposite end to intensify the snubbing effect, said valve structure including a sleeve slidably carried by the piston, a valve rod extending through the sleeve and being slidably supported by means within to the sleeve, said valve rod projecting from each end of the sleeve and adapted to have contact with the end members of the cylinders, a valve member on the valve rod at each end of the sleeve, and resilient means associated with each valve member for resiliently holding its member against a stop located on the valve rod inwardly of said valve member.

5. A shock absorber as defined by claim 4, wherein each end of the sleeve has contact with the valve member at its end for valve closing action therewith when the piston is moving in a direction toward said end, wherein each valve member when in valve closing action with the sleeve may additionally have an opening movement in a direction against the tension of its resilient means upon the existence of a predetermined pressure within the sleeve, and wherein the valve members are positioned on the rod with respect to the sleeve so that with one valve member in contact with its end of the sleeve the other valve member is spaced from its end of the sleeve.

6. A shock absorber comprising a closed cylinder, a piston movable therein, a piston rod connected to the piston and extending outwardly of the cylinder for imparting movement to the piston, valve structure carried by the piston including a sleeve extending through the piston to project from opposite sides and being mounted for slidable movement relative thereto, said sleeve providing a passage for flow of fluid from either end of the cylinder to the other, a valve member at each end of the sleeve and supported by the sleeve for closing and opening action therewith, and said valve members being responsive to reciprocating movements of the piston for effecting said action of the valve members in a manner whereby one valve member opens and the other valve member closes following an interval of time thereafter, said action taking place for each reciprocating stroke of the piston.

WILLARD J. SCHUPNER.

REFERENCES CITED

The following references are of record in the file of this patent:

UNITED STATES PATENTS

| Number | Name | Date |
|---|---|---|
| 142,773 | Craig et al. | Sept. 16, 1873 |
| 396,889 | Nickerson | Jan. 29, 1889 |
| 1,187,290 | Elling | June 13, 1916 |
| 1,368,429 | Goergen et al. | Feb. 15, 1921 |
| 1,655,786 | Guerritore | Jan. 10, 1928 |
| 1,833,939 | Gibbs | Dec. 1, 1931 |

Certificate of Correction

October 10, 1950

Patent No. 2,525,317

WILLARD J. SCHUPNER

It is hereby certified that error appears in the printed specification of the above numbered patent requiring correction as follows:

Column 8, line 21, after the word "whereby" insert *when*;

and that the said Letters Patent should be read as corrected above, so that the same may conform to the record of the case in the Patent Office.

Signed and sealed this 2nd day of January, A. D. 1951.

[SEAL]

THOMAS F. MURPHY,
*Assistant Commissioner of Patents.*